Figure 1:
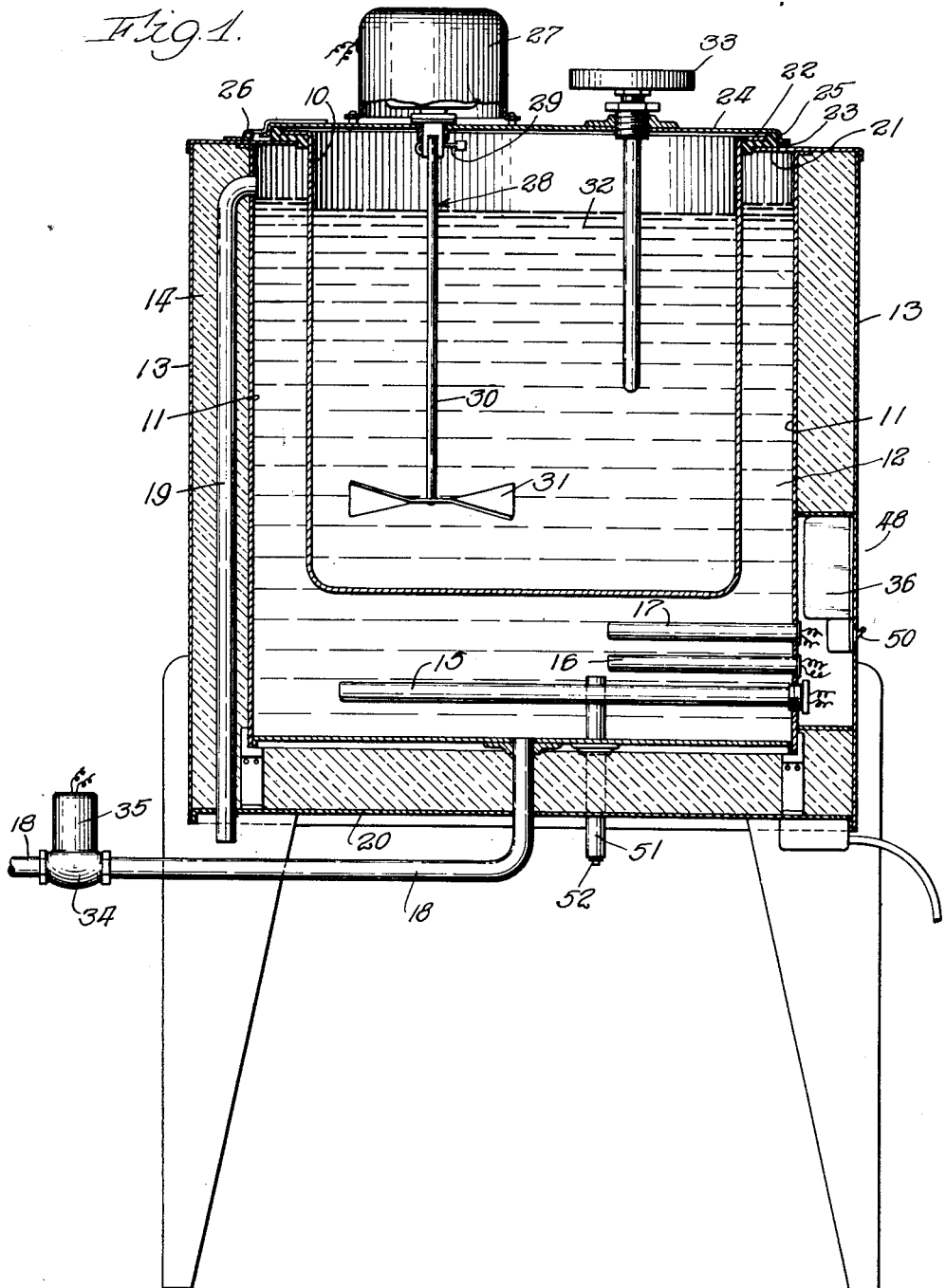

Dec. 30, 1952     E. W. LOSEE     2,623,449
PASTEURIZER

Filed Jan. 16, 1947     2 SHEETS—SHEET 1

Inventor:
Eugene W. Losee,
By Chritten, Schroeder, Merriam & Hofgren,
Attys.

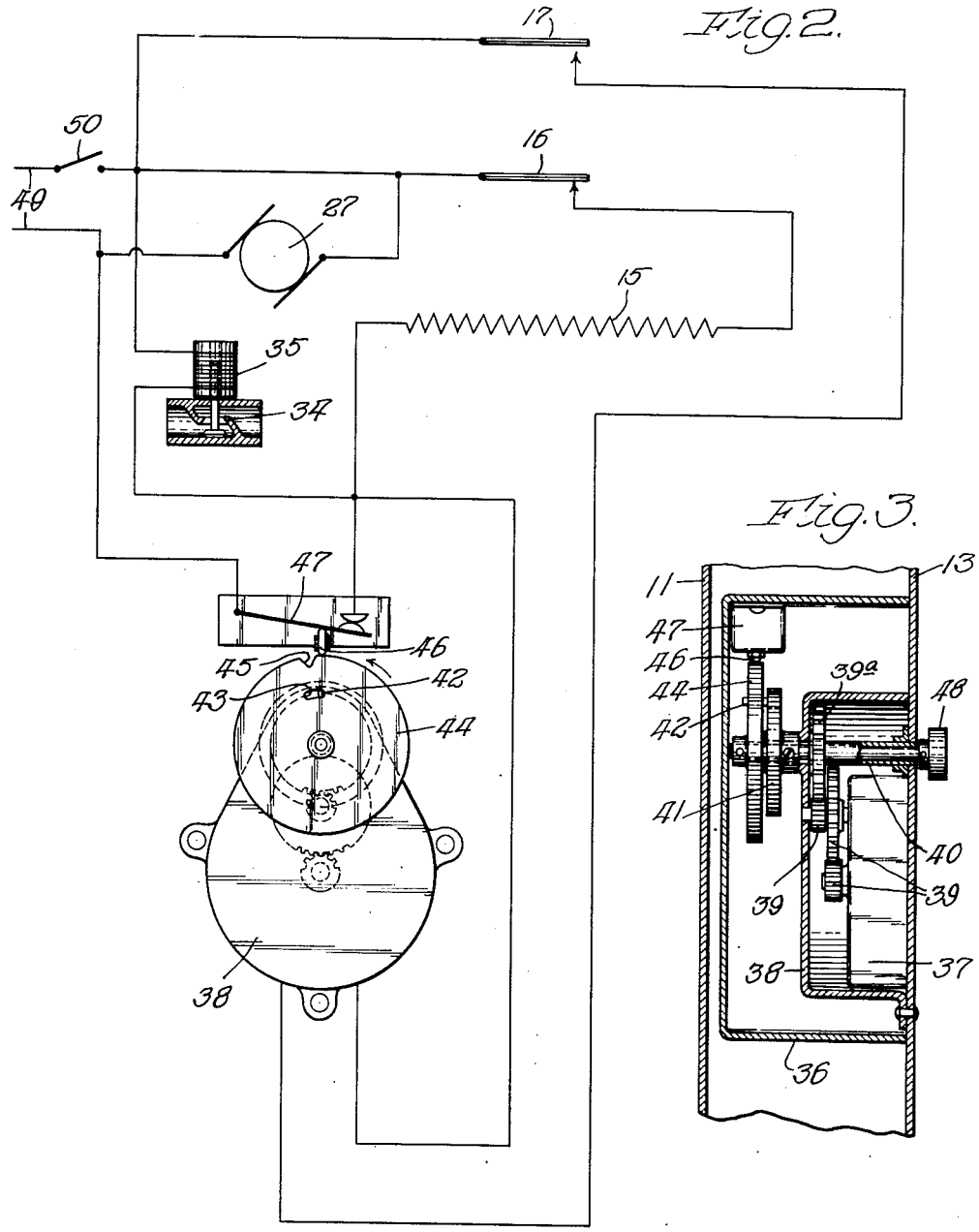

Patented Dec. 30, 1952

2,623,449

UNITED STATES PATENT OFFICE 2,623,449

PASTEURIZER

Eugene W. Losee, Hebron, Ill., assignor to Losee Products Co., a corporation of Illinois Application January 16, 1947, Serial No. 722,327

2 Claims. (Cl. 99—252)

This invention relates to a milk pasteurizer, and more particularly to a portable batch type pasteurizer comprising a unit wherein the milk is automatically heated to and maintained at a predetermined temperature for a predetermined time, and is thereafter automatically cooled rapidly to a temperature inhibiting bacterial growth.

One feature of this invention is the provision of an improved pasteurizer for milk or the like, wherein milk is heated to a predetermined temperature for a predetermined time with the heating being automatically controlled in order to maintain the temperature substantially constant; a further feature of this invention is the provision of means for automatically cooling the milk at the end of said predetermined time so as to prevent the increase of any bacteria that might remain; another feature of the invention is the provision of a container for receiving the milk, a water jacket around the container for both heating and cooling, means for heating the water in the jacket to a predetermined pasteurizing temperature, and means for automatically displacing the water out the top of the jacket with cooling water entering the bottom of the jacket to cool the milk rapidly; a further feature of the invention is the provision of improved apparatus for heating milk to a predetermined temperature and maintaining the temperature for a predetermined time by means of an automatic timing device whose operation is begun when the milk has reached a certain desired pasteurizing temperature and which serves to stop the heating and initiate the cooling at the end of said predetermined time without requiring the constant supervision of an operator; another feature of the invention is the provision of a readily accessible container for the milk during the pasteurization thereof with the container being normally closed by a hinged cover and with the cover containing a stirring device extending into the milk container, the distance between the hinge and the farthest point on the stirring device being less than the distance between the hinge and the opposite upper edge of the milk container so that the stirrer will clear when the cover is swung open and the container may be easily removed. Other features and advantages of the invention will be apparent from the following specification and the drawings, in which:

Fig. 1 is a vertical section substantially through the center of an apparatus embodying the invention; Fig. 2 is a diagrammatic view of a wiring diagram for the apparatus of Fig. 1; and Fig. 3 is a vertical section through the timing device shown in Fig. 2.

Milk is one of the most perfect foods known when it is of good quality, but it is also a food that is very susceptible to a high rate of bacterial growth. For this reason, it is advisable that milk be pasteurized before using. In many localities, however, such as rural communities, summer camps, and the like, pasteurized milk is not available. The user of milk is becoming more conscious of the advantages of pasteurized milk and even many farmers desire to pasteurize their own milk before using it, especially where it is to be given to babies or small children. The pasteurizer of the present invention is particularly adapted to use in these localities as it permits pasteurizing small quantities of milk; for example, from about five to ten gallons. The new pasteurizer is automatic in operation in that the milk can be raised to the desired temperature, maintained at this temperature for the time necessary to insure complete pasteurization, and then automatically and rapidly cooled at the end of this time. According to the "Milk Ordinance and Code" of the United States Public Health Service, there is a safe period immediately following pasteurization when bacteria growth is slow. The recommendation for cooling and storage is that milk can be safely stored for a period of two hours at a temperature of 70° F. or less. If storage is for a longer period, the milk should be cooled immediately to a temperature of 50° F. or less. In the new pasteurizer, the milk is cooled by water that can be drawn from a well or the like where the temperature is approximately 46 to 60° F. Thus, the temperature of the milk is reduced to within the safe range without the necessity of refrigeration. If the milk is to be stored for a long period, it should be transferred to a place where the milk can preferably be maintained at a temperature of 40° F. or less. With the apparatus of the present invention, the milk is cooled quite rapidly to a safe temperature before there has been any substantial multiplication of harmful bacteria.

When the apparatus of the present invention is used, the milk is put into a container around which is a fluid jacket. The fluid in the jacket is heated up to a predetermined temperature, for example about 143° F., while the milk is being constantly stirred. This temperature is automatically maintained for a predetermined time such as 30 minutes. At the end of this time, the heated fluid in the jacket is automatically displaced by a cooling fluid, which flows around the container and serves to cool the milk. During this cooling period, the milk is constantly stirred so that the cooling is quite rapid. The fluid used for heating the milk may be any desired heat transfer medium, but is ordinarily water. This water is ordinarily heated with an electric heating element in the jacket and the temperature is maintained constant by a heat responsive electric switch such as a thermostat also in the jacket. In order to provide for heating the fluid for a predetermined time, a timing device is employed that is started by a second heat responsive switch such as a thermostat also in the jacket and set at a temperature a few degrees lower than the setting of the first thermostat. At the end of the predetermined time, the timing device serves to break the electric circuit to the heating element. In order to cool the milk, the timing device also preferably starts the flow of cooling water into the jacket to displace the hot water and cool the milk. It is preferred that this cooling water be fed into the jacket at the bottom thereof and that the hot water be forced out of the top of the jacket. This insures the rapid removal of all hot water from the jacket. Flow of cooling water then continues through the jacket while the milk is being constantly stirred until the operator of the pasteurizer manually stops the flow of water and the action of the stirrer. At this time, the milk may be removed to a refrigerator or other cooled storage place. As can be seen, no supervision of the apparatus is required except to start it and then to stop the agitator and cooling water at some later time which is not critical. The raising of the temperature, the maintaining of this temperature for the desired time, and the cooling of the milk at the end of this time is all completely automatic in operation. The stirrer is operated before and during the pasteurization and during the cooling so that the milk will be uniformly treated.

It is a well-known fact that the temperature required for pasteurization is closely related to the time with the two being inversely proportional to each other. Thus, if the milk is heated at a relatively high temperature, the time may be proportionately less. Where the temperature is low, the time must be proportionately long. In the example given above, the temperature is about 143° F. and the time is 30 minutes. These may be changed, however, if desired.

The milk pasteurizer which is the subject of this invention is designed to be placed in the milk house, in the kitchen of the small farm, or summer cottage, or in any other clean location.

In the particular embodiment of the invention illustrated in the accompanying drawings, the milk pasteurizer comprises an inner container 10, a water container 11 therearound to provide a water jacket 12, outer walls 13 spaced from the water container 11 and containing an insulating material 14, a heating unit 15 in the bottom of the water jacket 12 containing an electric heating element, a first heat responsive switch unit 16 containing a thermostat switch, a second heat responsive switch unit 17 also containing a thermostat switch, a cold water inlet line 18 communicating with the bottom of the water jacket and an overflow water line 19 communicating with the top of the water jacket and extending down through the insulation 14 to a point below the bottom 20 of the unit.

The water container 11 has an open top defined by an inwardly extending flange 21. The milk container 10 also has an open top having an outwardly extending flange 22. This flange 22 rests on a gasket 23 of a resilient material such as a synthetic rubber that is supported on the flange 21. Extending across the top of the milk container 10 is a cover 24 having a downwardly extending flange 25 embracing an upwardly extending portion of the gasket 23. This cover is hingedly mounted by means of a hinge 26 adjacent the edge of the opening of the water container 11. Mounted on the cover 24 is a motor 27 having a shaft extending through the cover 24 and connected to the stirrer 28 by means of a removable locking pin 29. The stirrer 28 comprises a downwardly extending rod 30 having agitating blade 31 on the lower end thereof. The blades 31 serve to keep the milk 32 in circulation so that good heat transfer will be had through the walls of the container 10. Also mounted on the cover 24 is a thermometer 33. This thermometer is optional and only used to check the temperature of the milk to determine if the apparatus is operating at the correct temperature.

As the milk container 10 rests freely on the gasket 23, the container may be easily removed by merely turning back the cover 24 around its hinge 26. In order to accomplish this, the stirrer 28 is arranged so that the distance between the hinge 26 and the farther point on the stirrer 28 is less than the distance between the hinge and the opposite open edge of the milk container 10. Likewise, the distance between the hinge and the bottom of the thermometer 33 is less than the distance between the hinge and the opposite open edge of the milk container. As shown in Fig. 1, the farthest distance from the hinge 26 is measured out to the end of the right agitating blade 31. If the blades were turned 90 degrees from the position shown, however, this distance would be measured to a point adjacent the bottom of the rod 30.

Flow of water through the cold water inlet line 18 is controlled by valve 34 operated by an electric solenoid 35. When the solenoid is not energized by the electric current, the valve is open.

An important element of the present invention is the timing device used for maintaining a predetermined temperature of the milk for a predetermined time. The timing device, as shown, is mounted between the water container 11 and an outer wall 13. The timing device is arranged in a housing 36 and comprises a motor 37 arranged in a motor housing 38 and a series of reducing gears 39 with the last gear 39a being mounted on a shaft 40. These reducing gears are designed to reduce the speed of the motor to about 1/30 revolution per minute. A rotatable member 41 mounted on the shaft 40 therefore requires 30 minutes to make one complete revolution. The rotatable member 41 is provided with an outwardly extending stud 42 engaging an arcuate slot 43 in a second rotatable member 44. This second rotatable member is circular and is provided with a notch 45 on its periphery. The periphery of the rotatable member 44 slidably engages a link 46 which serves to keep closed an electric switch 47 except when the link 46 is in the notch 45. The stud 42 and the slot 43 are provided so that when the link 46 enters the notch 45 at the end of a cycle of operation, the momentum of the rotatable member 44 will not serve to force the link out of the slot and again close the switch 47. At the end of a cycle of operation, the stud 42 will be on the left side of the notch 43 when viewed as in Fig. 2. To prepare for the next cycle of operation, the rotatable member 44 is manually turned by any means desired, such as by the manual member 48, to force the link 46 out of the notch and into the position shown in Fig. 2. Here the stud 42 is on the right side of the slot. As soon as the operation of the timing device is begun, however, the stud will move over to the left side of the slot before rotation of the member 44 is begun.

The wiring diagram of the apparatus is shown in Fig. 2. As shown, the first heat responsive switch 16 is connected in series with the heating unit 15. The second heat responsive switch 17 is connected in series with the motor 37 of the timing device. The electric switch 47 is connected in series with the heating unit 15 and also in series with the solenoid 35. All these circuits are arranged so that they can be connected to a source 49 of electric current by merely closing a manual switch 50.

In the operation of the pasteurizer, milk is poured into the inner milk container 10. The manual switch 50 is closed, the knob 48 rotated a few degrees, and a manual valve (not shown) in the water line 18 is opened. The closing of the manual switch 50 serves to raise the armature of the solenoid 35 and close the valve 34 on the water inlet line 18. It also energizes the heating unit 15 which heats the water within the water jacket 12 to a predetermined temperature as determined by the setting of the first thermostat 16. This thermostat serves to maintain the temperature substantially constant. While the temperature of the water within the jacket is being raised to this predetermined temperature, the second thermostat 17 is closed as this thermostat is set to close a few degrees (as five degrees) below the setting of the first thermostat 16. The closing of the second thermostat starts the operation of the timing device and starts rotation of the rotatable member 44, as has been previously explained.

The closing of the manual switch 50 also starts the motor 27 which drives the stirrer 28. The motor continues to operate until the manual switch 50 is again manually opened. In some installations there has been provided a mercury switch (not shown) within the casing of the motor 27 in series with the motor circuit to stop the motor when the cover 24 is lifted.

At the end of the predetermined time, as controlled by the timing device, the link 46 enters the notch 45 and this serves to open the switch 47. The opening of the switch 47 opens the circuit to the heating unit 15, the circuit to the solenoid 35, and the timing device motor 37. As the solenoid is now de-energized, the armature falls and opens valve 34 of the cold water line 18. Cold water enters at the bottom of the water jacket 12 and rapidly displaces all the hot water in the water jacket with the hot water flowing out the overflow line 19. The cold water continues to flow in the water line 18, through the water jacket 12, and out the water line 19, thereby causing very rapid cooling of the milk. The motor 27 continues to operate the stirrer and the cooling water continues to circulate in the jacket until the motor and the water line are manually shut off. Thus, the pasteurizer does not require close supervision of an operator as the milk will be maintained at a uniformly low temperature until the operator desires to remove the milk.

In order to drain water from the water jacket 12, a drain pipe 51 is provided in the bottom of the apparatus with this drain pipe being normally closed by a removable plug 52.

Although the apparatus of the present invention is particularly useful in pasteurizing milk, it is readily apparent that it may be used for treating materials other than milk where it is desired to heat a material at a predetermined temperature for a predetermined time, and then to cool the material rapidly at the end of the predetermined time.

While I have shown and described one embodiment of my invention, it is to be understood that it is capable of many modifications. Changes, therefore, in the construction and arrangement may be made without departing from the spirit and scope of the invention as disclosed in the appended claims.

I claim:

1. A batch type milk pasteurizer, comprising: a container for the milk; a fluid jacket around the container receiving a heating fluid; an electric heating element operatively associated with the jacket for heating fluid confined therein and thereby heating milk within the container; a thermostatic switch operatively associated with the fluid in the jacket and opening at a predetermined pasteurizing temperature to control the fluid temperature; a cooling fluid conduit communicating with the fluid jacket; a normally closed valve in said fluid conduit; electrically operated valve opening means operatively associated with the valve; a fluid overflow conduit communicating with the top of the jacket; a timing device; electrical means for operating the timing device at the pasteurizing temperature; a timing device switch operatively associated with the timing device to be opened thereby on expiration of a predetermined pasteurizing time following commencement of operation of the timing device; an electrical circuit connecting the heating element, thermostatic switch and timing device switch so that the predetermined pasteurizing temperature controlled by the thermostat is maintained for the predetermined pasteurizing time controlled by the timing device; and an electrical circuit connecting the timing device switch and the valve opening means so that the cooling fluid conduit valve is opened at the end of the predetermined pasteurizing time controlled by the timing device to displace with cooling fluid the heated fluid from the jacket out the overflow conduit and thereby rapidly cool the pasteurized milk.

2. A batch type milk pasteurizer, comprising: a container for the milk; a fluid jacket around the container receiving a heating fluid; an electric heating element operatively associated with the jacket for heating fluid confined therein and thereby heating milk within the container; a first thermostatic switch operatively associated with the fluid in the jacket and opening at a predetermined pasteurizing temperature to control the fluid temperature; a second thermostatic switch operatively associated with the fluid in the jacket and opening at a predetermined temperature lower than said pasteurizing temperature; a cooling fluid conduit communicating with the fluid jacket; a normally closed valve in said fluid conduit; electrically operated valve opening means operatively associated with the valve; a fluid overflow conduit communicating with the top of the jacket; a timing device; an electric motor operatively associated with the timing device to operate the same on energization of the motor; a timing device switch operatively associated with the timing device to be opened thereby on expiration of a predetermined pasteurizing time following commencement of operation of the timing device; an electrical circuit connecting the second thermostatic switch and motor to energize the motor at the predetermined temperature of the setting of the second thermostatic switch and operate the timing device; an electrical circuit connecting the heating element, first thermostatic switch and timing device switch so that the predetermined pasteurizing temperature controlled by the first thermostat is maintained for the predetermined pasteurizing time controlled by the timing device; and an electrical circuit connecting the timing device switch and the valve opening means so that the cooling fluid conduit valve is opened at the end of the predetermined pasteurizing time controlled by the timing device to displace with cooling fluid the heated fluid from the jacket out the overflow conduit and thereby rapidly cool the pasteurized milk.

EUGENE W. LOSEE.

REFERENCES CITED

The following references are of record in the file of this patent:

UNITED STATES PATENTS

| Number | Name | Date |
| --- | --- | --- |
| 274,383 | Rigby | Mar. 20, 1883 |
| 672,454 | Nelson | Apr. 23, 1901 |
| 907,639 | Paul | Dec. 22, 1908 |
| 1,621,620 | Bast | Mar. 22, 1927 |
| 1,951,396 | Corbett | Mar. 20, 1934 |
| 2,161,847 | Blodgett | June 13, 1939 |
| 2,321,235 | Olson | June 8, 1943 |
| 2,427,146 | Lee | Sept. 9, 1947 |
| 2,513,577 | Malme | July 4, 1950 |